United States Patent
Jacob

(10) Patent No.: US 8,061,277 B2
(45) Date of Patent: Nov. 22, 2011

(54) ROAD AND RAIL VEHICLE WITH PIVOTABLE AXLE AND ASSOCIATED METHODS

(75) Inventor: Charles R. Jacob, American Fork, UT (US)

(73) Assignee: Savage Services Corporation, Salt Lake City, UT (US)

( * ) Notice: Subject to any disclaimer, the term of this patent is extended or adjusted under 35 U.S.C. 154(b) by 349 days.

(21) Appl. No.: 12/342,980

(22) Filed: Dec. 23, 2008

(65) Prior Publication Data
US 2009/0194000 A1 Aug. 6, 2009

Related U.S. Application Data

(60) Provisional application No. 61/009,756, filed on Dec. 31, 2007.

(51) Int. Cl.
*B61C 13/00* (2006.01)
(52) U.S. Cl. .................................. 105/72.2; 105/215.2
(58) Field of Classification Search ............... 105/72.2, 105/215.1, 215.2; 280/86.5; 104/242, 243, 104/245; 298/23 R
See application file for complete search history.

(56) References Cited

U.S. PATENT DOCUMENTS

| | | | |
|---|---|---|---|
| 3,877,390 A | 4/1975 | Wallace | |
| 4,048,925 A | 9/1977 | Storm | |
| 5,016,544 A | 5/1991 | Woollam | |
| 5,103,740 A * | 4/1992 | Masse | 105/72.2 |
| 5,868,078 A * | 2/1999 | Madison | 105/72.2 |
| 6,976,432 B2 | 12/2005 | Jacob | |

* cited by examiner

*Primary Examiner* — Mark Le
(74) *Attorney, Agent, or Firm* — Thorpe North & Western LLP

(57) ABSTRACT

A road and rail vehicle includes a towing vehicle having a plurality of axles coupled to an elongate frame with road wheels disposed on the axles. The plurality of axles include at least one rear drive axle. Rail guide wheels are movably coupled to the frame. The rail guide wheels are movable between a lowered position engageable with a pair of fixed rails of a railroad track and a raised position away from the rails. A crane is coupled to the frame rearward of a rearmost road wheel. A tag axle is pivotally coupled to the frame rearward of the crane. The tag axle pivots between a lowered position that is engageable with a roadway and a raised position adjacent the crane.

13 Claims, 5 Drawing Sheets

ROAD AND RAIL VEHICLE WITH PIVOTABLE AXLE AND ASSOCIATED METHODS

PRIORITY CLAIM

Benefit is claimed of U.S. Provisional Patent Application No. 61/009,756, filed Dec. 31, 2007, which is herein incorporated by reference in its entirety for all purposes.

BACKGROUND OF THE INVENTION

Road and rail vehicles have been developed that can travel on automotive roadways and also on fixed rails of a railroad track, or railways. Such vehicles are often used by railroad maintenance crews who may have to travel a distance on a regular roadway and an additional distance on a railway in order to reach a section of railroad track needing maintenance. These road and rail vehicles can also be useful in moving railcars in a switchyards because they are not stuck on the rails as are locomotive engines, but instead they can move cars on one rail line and then drive off the rail line, across the tracks to a different rail line without having to stay on the rails and use a switch to move to a different rail line.

Road and rail vehicles are often designed with two sets of wheels: a rubber based set of wheels for traveling on a roadway and a set of steel wheels for traveling on the tracks of a railway. On such road and rail vehicles one of the sets of wheels is retractable such that when the vehicle is on the roadway the rubber wheels can engage the ground and propel the vehicle, and when the vehicle is on a railway, the steel wheels can engage the rails to guide the vehicle on the track and to propel the vehicle. Other road and rail vehicles use the rubber wheels to propel the vehicle on both the roadway and the railway.

Road and rail vehicles can also be used to move railcars in place of a larger more expensive locomotive engine, thereby freeing the locomotive engine to move larger payloads. However, it will be appreciated that railcars can be considerably heavier than the road and rail vehicle and the weight of the railcar on the hitch of the road and rail vehicle can pivot the vehicle about the rear axle thereby reducing traction on the drive wheels. Consequently, it is sometimes desirable to place weights on a cargo bed of the road and rail vehicle so as to properly distribute weight along the frame of the vehicle in relation to the railcar being towed. This weighting of the road and rail vehicle helps to maintain contact between the wheels of the road and rail vehicle and the fixed rails of the railway. Without this extra loading the wheels can be lifted off the rails by the weight of the railcar, and the road and rail vehicle can loose tractive force for towing the railcar.

Unfortunately, loading the weights onto the cargo bed is not always possible. Lifting equipment is often needed to place the load onto the cargo bed of the road and rail vehicle. Such lifting equipment is often unavailable or impractical to use in a switch yard or on a remote rail line. Additionally, weights suitably heavy to counterbalance the weight of the railcar are not always readily available especially when the road and rail vehicle is being used on a remote railway.

SUMMARY OF THE INVENTION

The invention provides a road and rail vehicle including a towing vehicle having a plurality of axles coupled to an elongate frame with road wheels disposed on the axles. The plurality of axles can include at least one rear drive axle. Rail guide wheels can be movably coupled to the frame. The rail guide wheels can be movable between a lowered position engageable with a pair of fixed rails of a railroad track and a raised position away from the rails. A crane can be coupled to the frame rearward of a rearmost road wheel. A tag axle can be pivotally coupled to the frame rearward of the crane. The tag axle can pivot between a lowered position that is engageable with a roadway and a raised position adjacent the crane.

Additional features and advantages of the invention will be apparent from the detailed description which follows, taken in conjunction with the accompanying drawings, which together illustrate, by way of example, features of the invention.

DETAILED DESCRIPTION

Figure 1:
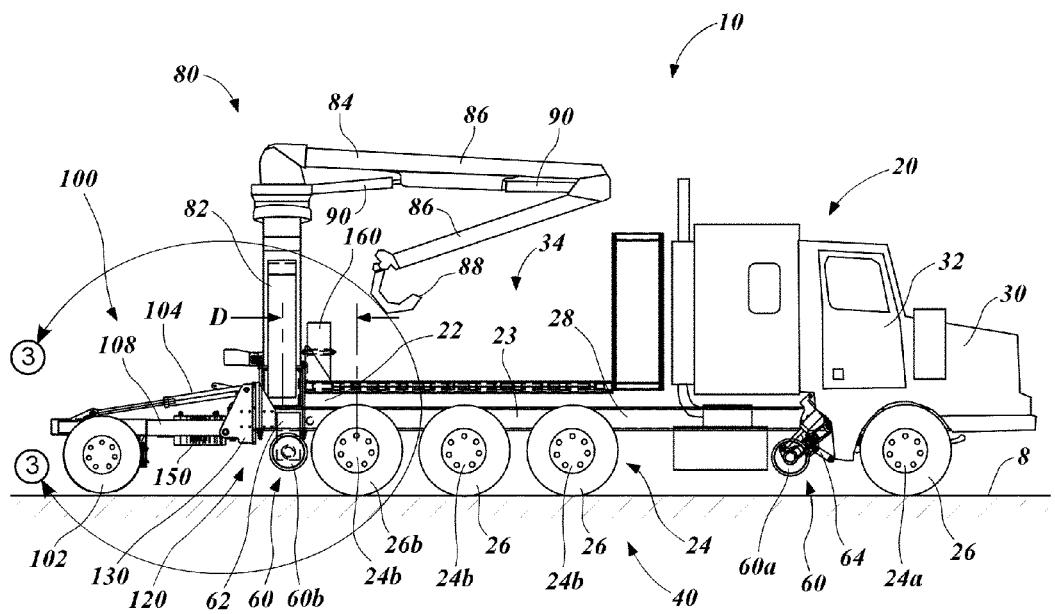
FIG. 1 is a side view of a road and rail vehicle in accordance with an embodiment of the present invention, shown with a tag axle in a lowered position.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The embodiments of the present invention described herein generally provide for a road and rail vehicle that can travel on either an automotive roadway or on a pair of fixed rails of a railroad track, or railway. The road and rail vehicle can include a towing vehicle such as a truck or semi-tractor that can tow wheeled trailers such as semi trailers or railcars. The towing vehicle can have a set of inflated rubber wheels that can support and carry the vehicle on the roadway and a set of steel wheels that can guide and support the vehicle when traveling on the railway. The rubber wheels can be driven by a drive train of the towing vehicle and can propel the vehicle on both the roadway and the railway. The steel wheels can be retractable to a raised position so that the steel wheels are out of the way and do not contact the ground when the road and rail vehicle is traveling on a roadway. When traveling on a railway, the steel wheels can be extended to a lowered position to engage the fixed rails of the railroad track. The rubber wheels can engage both the roadway and the rails so as to propel the towing vehicle on both the roadway and the railway.

The road and rail vehicle can also include a pivotable tag axle pivotally coupled to the rear of a cargo bed of the towing vehicle. The tag axle can pivot or rotate between a raised position and a lowered position. In the raised position a set of inflated rubber wheels or tires coupled to the tag axle are positioned above the cargo deck of the towing vehicle. In this position the weight of the tax axle and wheels is carried by the other axles of the towing vehicle, and the wheels of the tag axle do not engage the roadway or railway. In the lowered position, the wheels of the tag axle can engage the roadway and the tag axle can help to carry a portion of the weight of the towing vehicle. Thus, the tag axle can be deployed to the lowered position when the road and rail vehicle is driven on a roadway and moved to the raised position when the road and rail vehicle is traveling on a railway.

The road and rail vehicle can also include a crane coupled to a rear portion of the frame of the vehicle. The crane can be used to load and unload equipment or weights onto a cargo bed of the towing vehicle. Positioning the crane on the rear portion of the frame of the towing vehicle allows the crane to weight the rear drive axle and tires of the vehicle when the tag axle is in the raised position. When the tag axle is in the lowered positions the weight of the crane is distributed between the tag axle and the fixed axles of the towing vehicle.

As illustrated in FIGS. 1-6, a road and rail vehicle, indicated generally at 10, in accordance with an embodiment of the present invention is shown for use in traveling on a roadway 8 or a railway 6. The road and rail vehicle 10 includes a towing vehicle, indicated generally at 20, with regular inflatable rubber based road wheels, indicated generally at 40, and steel rail guide wheels, indicated generally at 60. The road and rail vehicle 10 also includes a crane, indicated generally at 80 and a pivotal tag axle, indicated generally at 100, coupled to a rear portion 22 of the towing vehicle 20.

The towing vehicle 20 can be an automotive vehicle, such as a pick-up truck, semi-truck, semi-tractor, or the like, with sufficient power to pull a large trailer, semi-trailer, or railcar. The towing vehicle 20 can have a plurality of axles, indicated generally at 24, coupled to an elongate frame 28. The axles 24 can be fixed to the frame 28. The axles 24 can have inflated, rubber based tires or wheels 26 that support and carry the towing vehicle 20 on the roadway 8. For example, the towing vehicle 20 can have a front axle and a rear axle with front and rear wheels. As another example, shown in FIGS. 1-2, the towing vehicle 20 can have four axles, with a front axle 24a and three rear axles 24b with wheels 26 attached to each axle for supporting the towing vehicle 20 on the roadway. It will be appreciated that additional axles 24 may be required by road laws based on the weight of the vehicle.

One or all of the axles 24 of the towing vehicle 20 can be drive axles. The drive axles can be operatively coupled to the drive train (not shown) of the towing vehicle 20 such that the wheels 26 of the drive axles propel the vehicle on the roadway.

Figure 2:
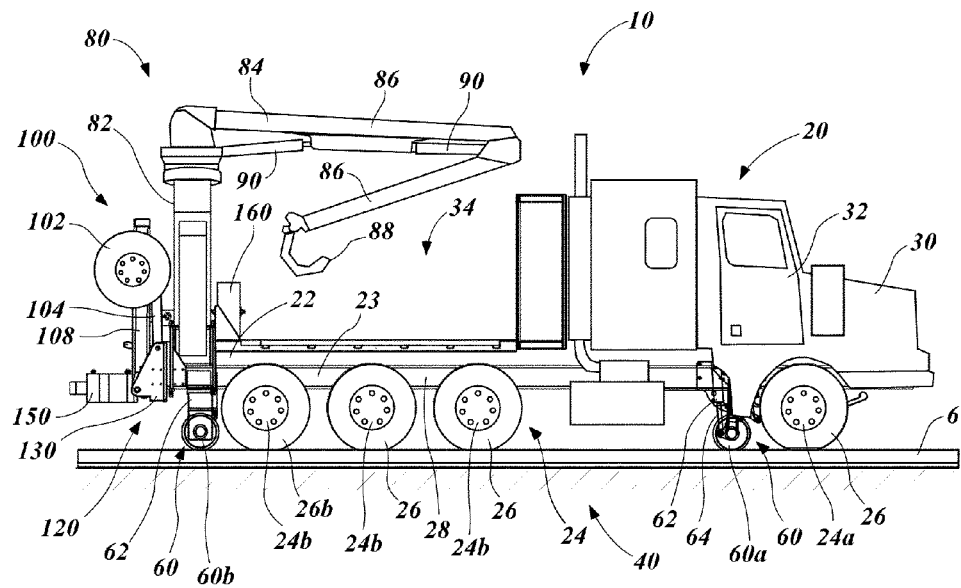
FIG. 2 is a side view of the road and rail vehicle of FIG. 1, shown with the tag axle in a raised position.
Figure 3:
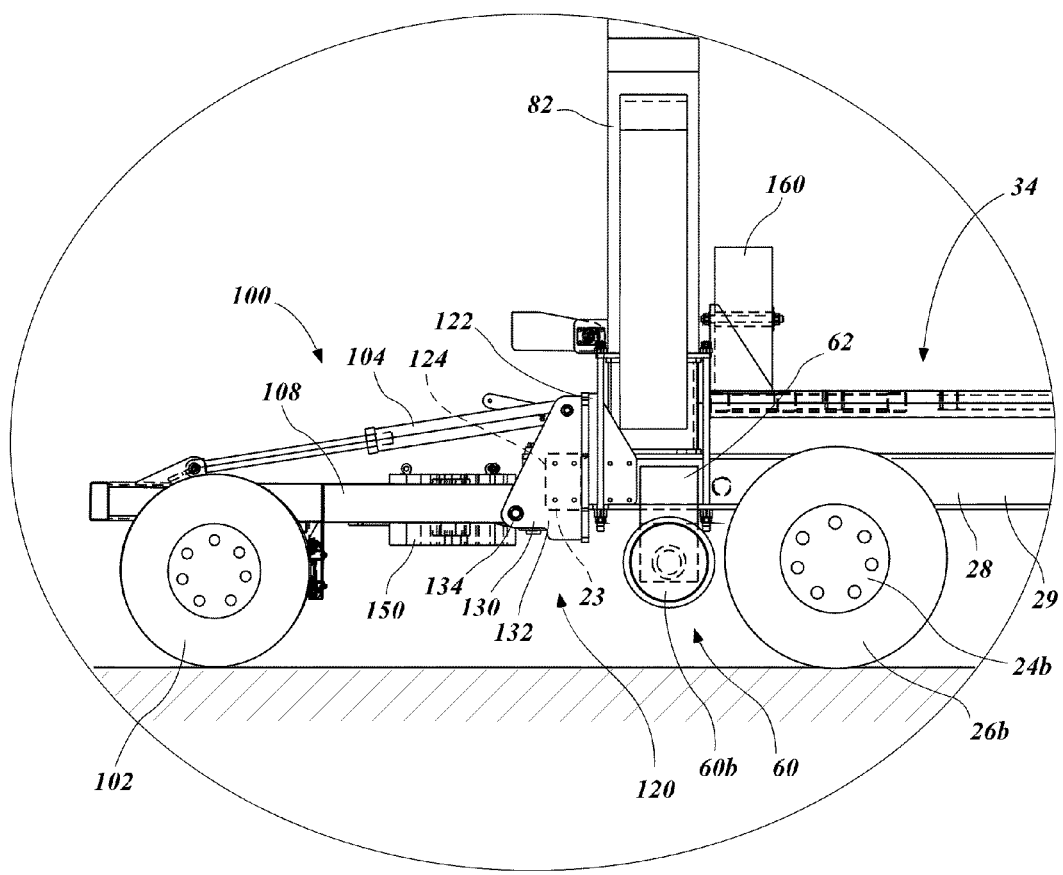
FIG. 3 is a fragmentary side view of the road and rail vehicle of FIG. 1, shown with the tag axle in the lowered position.
Figure 4:
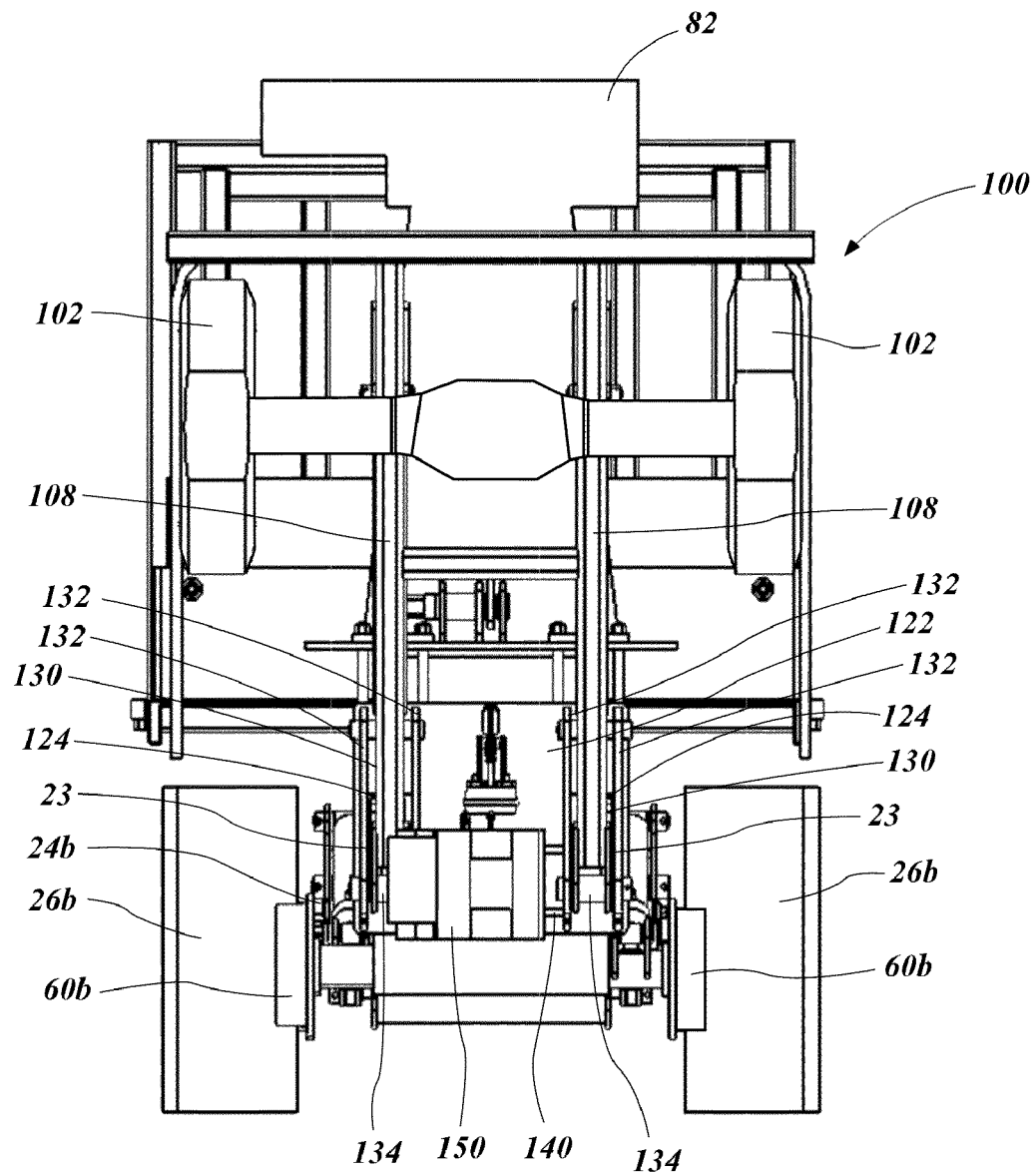
FIG. 4 is a rear view of the road and rail vehicle of FIG. 1, shown with the tag axle in the raised position.
Figure 5:
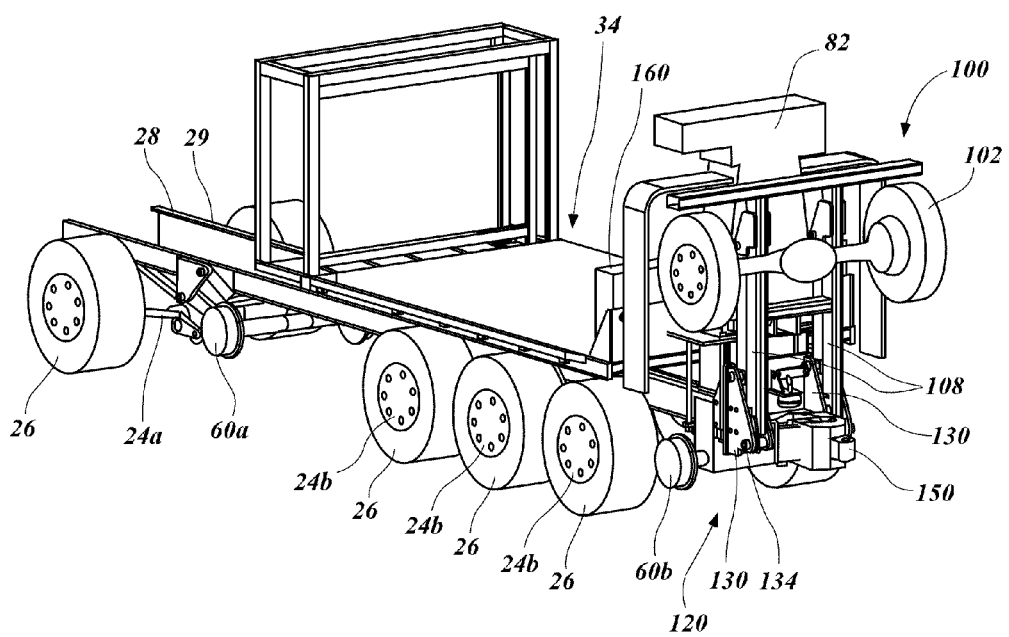
FIG. 5 is a perspective view of a frame and cargo bed of the road and rail vehicle of FIG. 1, shown with the tag axle in the raised position.
Figure 6:
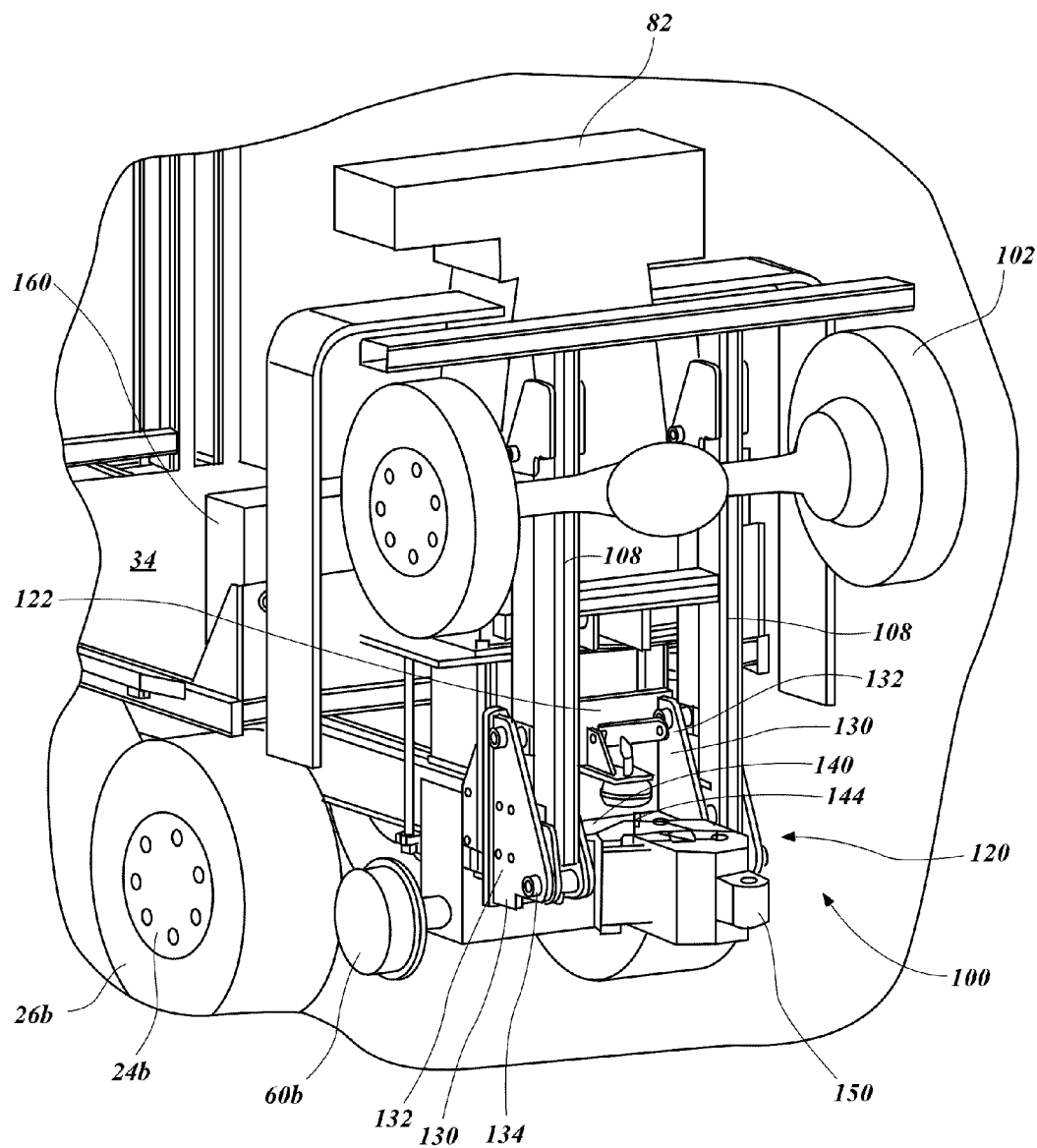
FIG. 6 is a fragmentary perspective view of a rear portion of the road and rail vehicle of FIG. 1.

In the embodiment shown in FIGS. 1-2, the towing vehicle 20 can be a semi-tractor 30 that can have a personnel cab 32 and a cargo bed, indicated generally at 34. The cargo bed 34 can include a flat bed 36 with or without sidewalls to accommodate various kinds of cargo. The cargo bed 34 can carry an additional weight (not shown) so as to weigh down the rear axles 24b in order to provide greater traction or tractive forces to the wheels 26 on the axles. In this way, the drive wheels 26 can better propel the towing vehicle 20 when on a railway and when pulling train cars.

The towing vehicle 20 can also have a plurality of metal rail guide wheels, indicated generally at 60, operatively coupled to the frame 28 of the towing vehicle. In one embodiment, a first pair of rail guide wheels 60a can be positioned adjacent the front axle 24a of the towing vehicle, and a second pair of rail guide wheels 60b can be positioned rearward of the rearmost axle 54b and even rearward of the road wheels on the rearmost axle. The rail guide wheels 60 can be metal such as steel.

The rail guide wheels 60 can be movable between a raised position and a lowered position. In the raised position the rail guide wheels 60 can be positioned above the bottom of the road wheels 26 on the axles 24 of the towing vehicle 20, as shown in FIG. 1. In the lowered position, the rail guide wheels 60 can be positioned to engage the fixed rails 6 of a railroad track or railway, as shown in FIG. 2. Thus, in the lowered position the rail guide wheels 60 can help to support and guide the towing vehicle 20 along the tracks 8 of the railway.

The rail guide wheels 60 can be raised and lowered by an actuator 62. In one embodiment, the actuator 62 can include a hydraulic ram 64. In another embodiment the actuator can include an electric motor (not shown) coupled to the internal combustion engine of the towing vehicle 20. Other actuators, as known in the art, can also be used to raise or lower the rail guide wheels 60.

The crane 80 can be coupled to a rear portion 22 of the elongate frame 28 of the towing vehicle 20. The crane 80 can include a stanchion 82 extending upward from the cargo bed of the towing vehicle, and an articulated boom 84 coupled to the stanchion 82. The stanchion 82 of the crane 80 can be positioned directly over rearmost pair of rail guide wheels 60b so as to provide weight to the rear rail guide wheels 60b when the rear rail guide wheels 60b are in the lowered position.

The boom 84 can rotate about the stanchion 82 and can have a series of linked arms 86. A lifting device such as a hook 88 can be coupled to an end of the boom 82. The lifting device can facilitate lifting objects onto or off the cargo bed 34 of the towing vehicle 20. Actuators, such as hydraulic rams 90, can move the boom to perform desired tasks.

The crane 80 can be positioned along the rear portion 22 of the frame 28 rearward of a rearmost road wheel 26b. In this way, the crane 80 can be positioned in relation to the cargo bed 34 of the towing vehicle 20 so as to facilitate moving loads on and off the cargo bed, and to maximize available space of the cargo bed. Additionally, with the crane 80 positioned rearward of the rearmost road wheel 26b, the weight of the crane can be applied to the axles 24 of the towing vehicle 20 in order to increase the tractive force of the wheels 26 of the drive axle. Advantageously, the distance, D, between the crane 80 and the rear most axle 24b can act as a moment arm and further increase the downward applied force on the rear axles 24b and especially the rearmost wheel 26b.

The tag axle 100 can be pivotally coupled to an end 23 (FIG. 3) of the frame 28 and rearward of the crane 80. The tag axle 100 can have inflated, rubber tires or wheels 102, similar to the wheels on the axles 24 of the towing vehicle 20.

The tag axle 100 can pivot between a lowered position and a raised position. In the raised position the wheels 102 of the tag axle 100 can be positioned adjacent the crane 80 and at a higher elevation than the cargo deck 34 of the towing vehicle 20, as shown in FIG. 2. In the lowered position the wheels 102 of the tag axle 100 can be positioned in line with the wheels 26 of the drive axles 24 and can engage the roadway 8 to help support and carry the towing vehicle 50.

The tag axle 100 can be moved between the raised position and the lowered position by an actuator 104, such as a hydraulic ram. In another embodiment the actuator 104 can include an electric motor (not shown) electrically powered by the electrical system of the towing vehicle 20. Other actuators, as known in the art, can also be used to raise or lower the tag axle 100.

The tag axle 100 provides several advantages to the road and rail vehicle 10. For example, the tag axle 100 can be moved to the lowered position when the road and rail vehicle 10 is traveling on a roadway 8 that requires a greater number of axles on a heavy vehicle. Additionally, the tag axle 100 can be moved to the raised position when the road and rail vehicle 10 is traveling on the fixed rails 6 of a railroad track and additional weight is needed on the drive axles so as to increase the tractive forces of the drive wheels on the rails for moving heavy loads and pulling railcars. With the tag axle 100 in the raised position, the weight of the tag axle and the wheels 102 coupled to the tag axle is distributed to the other axles 24 of the towing vehicle 20, including the drive axles and the drive wheels.

It will be appreciated that the crane 80 and tag axle 100 can be positioned with respect to the frame 28 such that a combined weight of the tag axle 100 and the crane 80 can be at least partially carried by the road wheels 26 of the rear drive axle 24b when the tag axle is in the raised position. In this way, the load or weight on the drive axle 24b and wheels 26 can be increased by raising the tag axle 100 in order to increase the tractive force of the drive wheels. Thus, when the towing vehicle 10 is on rail road tracks and is either carrying a heavy load on the cargo bed or towing a heavy railcar, a compensating or weighting load can be distributed to the drive axle by raising the tag axle 100 to the raised position.

Additionally, the weight of the crane 80 can be at least partially carried by the road wheels 102 on the tag axle 100 when the tag axle is in the lowered position. In this way, the load of the rear axles 24b can be decreased by lowering the tag axle 100 to the lower position in order to distribute at least a portion of the load of the crane 80 and cargo to the tag axle 100. Thus, when the towing vehicle 10 is on a roadway the tag axle 100 can be lowered to distribute the load of the vehicle across the fixed axles 24 and the tag axle 100 in order to maintain the weight requirements of the roadway.

The crane 80 and the tag axle 100 can be coupled to the rear portion 22 of the frame 28 by a mounting fixture, indicated generally at 120. The mounting fixture 120 can include a plate 122 that can be coupled to the frame 28. The plate 122 can have a pair of apertures 124. Each aperture 124 can be sized and shaped to receive an elongate beam 23 of the frame 28. The plate 122 can be oriented substantially perpendicular to the longitudinal axis of the beams 23 and can provide a mounting surface for a pair of pivot brackets 130 that couple to the tag axle 100.

The pair pivot brackets 130 can coupled to the plate and can provide a pivot point for a pair of parallel spaced apart arms 108 of the tag axle 100. Each pivot bracket 130 can have a pair of sides 132 that can bracket the elongate beam 23 of the frame 28 that extends through the aperture 124 in the plate 122. The sides 132 can extend away from the plate 122 to a pivot connection 134 that can be coupled to one of the arms 108 of the tag axle 100.

A gusset 140 can extend between the pair of pivot brackets 130. The gusset 140 can extend rearward to a pivot connection 144 that can be coupled to a railcar coupler 150.

Additionally, the railcar coupler 150 can be coupled to the rear end 124 of the frame 28. The railcar coupler 150 can be sized and shaped to couple to a corresponding coupler disposed on a railcar (not shown) positioned on the railway. In this way, the road and rail vehicle 10 can be used to move railcars on a railway. The pair of spaced apart, parallel arms 108 of the tag axle 100 can straddle and pivot around the railcar coupler 150. Thus, the railcar coupler 150 can be positioned between the pair of parallel arms 108 of the tag axle 100 such that the railcar coupler 150 can be accessible for engagement with a railcar when the tag axle 100 is in the raised position and inaccessible for engagement with a railcar when the tag axle 100 is in the lowered position.

The road and rail vehicle 10 can also include a controller 160 operatively coupled to the tag axle 100 and the rail guide wheels 60. The controller 160 can be operable to selectively lower the tag axle 100 to allow the towing vehicle 20 to travel on a roadway 8. Additionally, the controller 160 can be used to raise the tag axle 100 while simultaneously lowering the rail guide wheels 60 to shift the weight of the tag axle over the drive axle and to allow the towing vehicle 20 to travel on the fixed rails 6 of the railway.

The present invention also provides for a method for varying a load on a drive axle and drive axle wheels of a road and rail vehicle. The drive axle and drive wheels can be configured to propel the vehicle when the vehicle is traveling on either a roadway or on fixed rails of a railway. The drive wheels can be inflatable rubber based wheels configured to support and carry the vehicle on a roadway.

The method can include distributing at least a portion of a weight of a crane coupled to a rear end of the towing vehicle between a pivotable tag axle coupled to a rear portion of a frame of the road rail vehicle and the drive axle by moving the tag axle from a raised position to a lowered position to allow road wheels coupled to the tag axle to contact the roadway. The drive axle can be engaged to turn road wheels coupled to the drive axle to propel the towing vehicle along the roadway. The tag axle can be moved to the raised position to increase the weight on the drive axle. The towing vehicle can be driven onto the fixed rails of the railroad track such that the road wheels of the drive axle contact the fixed rails. Rail guide wheels coupled to the frame of the towing vehicle can be moved from a raised position to a lowered position to engage the fixed rails of the railroad track. The drive axle can be engaged to turn the road wheels coupled to the drive axle to propel the towing vehicle along the fixed rails of the railroad track.

The method can also include moving the rail guide wheels to the raised position. The towing vehicle can be driven off the fixed rails of the railroad track and onto a roadway. The tag axle can be moved to the lowered position to allow the road wheels coupled to the tag axle to contact the roadway.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed:
1. A road and rail vehicle, comprising:
a towing vehicle having a plurality of axles coupled to an elongate frame with road wheels disposed on the axles, and including at least one rear drive axle;
rail guide wheels movably coupled to the frame and movable between a lowered position engageable with a pair of fixed rails of a railroad track and a raised position away from the rails;
a crane coupled to the frame rearward of a rearmost road wheel;

a tag axle pivotally coupled to the frame rearward of the crane and pivotal between a lowered position engageable with a roadway and a raised position adjacent the crane; and a mounting fixture coupled to a rear portion of the frame, the mounting fixture further comprising:

a plate coupled to the frame and having a pair of apertures, each aperture sized and shaped to receive an elongate beam of the frame;

a pair of pivot brackets coupled to the plate, each pivot bracket having a pair sides bracketing the elongate beam of the frame extending through the aperture, the pair sides extending away from the plate to a pivot connection coupled to an arm of the tag axle; and a gusset extending between the pair of pivot brackets and rearward to the pivot connection coupled to a railcar coupler.

2. The road and rail vehicle of claim 1, wherein the crane and tag axle are positioned with respect to the frame such that a combined weight of the tag axle and the crane is at least partially carried by the road wheels of the at least one rear drive axle when the tag axle is in the raised position, and a weight of the crane is at least partially carried by road wheels on the tag axle when the tag axle is in the lowered position.

3. The road and rail vehicle of claim 1, wherein the rail guide wheels further includes a pair of forward guide wheels associated with a front portion of the towing vehicle and a pair of rearward guide wheels associated with a rear portion of the towing vehicle.

4. The road and rail vehicle of claim 1, wherein the crane is positioned directly over a rearmost pair of rail guide wheels.

5. The road and rail vehicle of claim 1, wherein the crane further includes a boom pivotally coupled to a stanchion, the boom being configured to move loads on and off a cargo bed of the towing vehicle.

6. The road and rail vehicle of claim 1, further comprising the railcar coupler coupled to an end of the frame and configured to couple to a corresponding coupler disposed on a railcar positioned on a railroad track.

7. The road and rail vehicle of claim 6, wherein the railcar coupler is positioned between a pair of parallel arms of the tag axle such that the railcar coupler is accessible for engagement with the railcar when the tag axle is in the raised position and inaccessible for engagement with the railcar when the tag axle is in the lowered position.

8. The road and rail vehicle of claim 1, further comprising a controller operatively coupled to the tag axle and the rail guide wheels and operable to selectively lower the tag axle to allow the towing vehicle to travel on a roadway and to raise the tag axle and simultaneously lower the rail guide wheels to shift a weight of the tag axle over the drive axle and to allow the towing vehicle to travel on a railway.

9. A road and rail vehicle, comprising:

a towing vehicle having a frame and a plurality of axles with road wheels coupled to the frame for supporting the towing vehicle on a roadway, the plurality of axles including a drive axle for propelling the towing vehicle on the roadway and a railway by at least one road wheel;

a crane coupled to the frame rearward of a rearmost road wheel;

a tag axle pivotally coupled to the frame rearward of the crane and pivotal between a lowered position engageable with the roadway and a raised position adjacent the crane;

a railcar coupler coupled to a rear end of the frame;

rail guide wheels movably coupled to the frame rearward of the rearmost road wheel and below the crane, and movable between a lowered position engageable with a pair of fixed rails of a railroad track and a raised position; and a mounting fixture coupled to a rear portion of the frame, the mounting fixture further comprising:

a plate coupled to the frame and having a pair of apertures, each aperture sized and shaped to receive an elongate beam of the frame;

a pair of pivot brackets coupled to the plate, each pivot bracket having a pair sides bracketing the elongate beam of the frame extending through the aperture, the pair sides extending away from the plate to a pivot connection coupled to an arm of the tag axle; and a gusset extending between the pair of pivot brackets and rearward to the pivot connection coupled to the railcar coupler.

10. The road and rail vehicle of claim 9, wherein the crane and tag axle are positioned with respect to the frame such that a combined weight of the tag axle and the crane is at least partially carried by the road wheels of the at least one rear drive axle when the tag axle is in the raised position, and a weight of the crane is at least partially carried by road wheels on the tag axle when the tag axle is in the lowered position.

11. The road and rail vehicle of claim 9, further including a pair of forward guide wheels associated with a front portion of the towing vehicle.

12. The road and rail vehicle of claim 9, wherein the crane is positioned directly over the rail guide wheels.

13. The road and rail vehicle of claim 9, further comprising a controller operatively coupled to the tag axle and the rail guide wheels and operable to selectively lower the tag axle to allow the towing vehicle to travel on the roadway and to raise the tag axle and simultaneously lower the rail guide wheels to shift a weight of the tag axle over the drive axle and to allow the towing vehicle to travel on the railway.

* * * * *